United States Patent [19]

Schmid et al.

[11] Patent Number: 5,105,929

[45] Date of Patent: Apr. 21, 1992

[54] HYDRAULIC MODULATION VALVE

[75] Inventors: David R. Schmid, Ephrata, Pa.; Ramakrishna Emmadi, Bloomfield Hills, Mich.

[73] Assignee: Ford New Holland, Inc., New Holland, Pa.

[21] Appl. No.: 709,936

[22] Filed: Jun. 4, 1991

[51] Int. Cl.5 .................. F16D 67/04; F16D 25/14
[52] U.S. Cl. ................... 192/12 C; 60/413;
    91/459; 137/625.64; 137/625.68; 192/109 F
[58] Field of Search ............ 192/12 C, 109 F, 87.18;
    60/413; 91/459; 137/625.64, 625.68

[56] References Cited

U.S. PATENT DOCUMENTS

| | | | |
|---|---|---|---|
| 3,669,229 | 6/1972 | Ronayne et al. | 192/12 C |
| 3,985,063 | 10/1976 | Lemon | 192/109 F X |
| 3,991,787 | 11/1976 | Schmitt et al. | 192/12 C X |
| 4,161,895 | 7/1979 | Ushijima et al. | 192/109 F X |
| 4,227,602 | 10/1980 | Ideta et al. | 192/109 F |
| 4,265,346 | 5/1981 | Emmadi | 192/109 F X |
| 4,278,155 | 7/1981 | Golan et al. | 192/12 C X |
| 4,411,345 | 10/1983 | Haight et al. | 192/12 C |
| 4,465,168 | 8/1984 | Sato | 192/109 F X |
| 4,506,773 | 3/1985 | Schott | 192/109 F X |
| 4,657,042 | 4/1987 | Lewis | 192/109 F X |

Primary Examiner—Rodney H. Bonck
Attorney, Agent, or Firm—Larry W. Miller; Frank A. Seemar

[57] ABSTRACT

A hydraulic modulation valve for use in conjuction with a tractor power-takeoff shaft to prevent an instantaneous loading of the hydraulic clutch controlling the operation of the power-takeoff shaft is disclosed wherein the supply line leading from the valve spool to the hydraulic clutch is in flow communication with a modulation chamber. A yieldable spring-loaded piston is moved within the modulation chamber from an initial position to an operating position to allow the hydraulic pressure to increase from zero pressure to a working pressure for the hydraulic clutch. A bypass line bleeds hydraulic fluid from the inlet end of the modulation chamber to slow the rate at which hydraulic pressure is increased within the modulation chamber. The movable piston closes off the inlet opening to the bypass line when in the initial position adjacent the inlet end of the modulation chamber to permit an initial rapid increase of hydraulic pressure, while the piston closes off the outlet opening of the bypass line when reaching the operating position to permit the working pressure within the modulation chamber to remain constant.

13 Claims, 4 Drawing Sheets

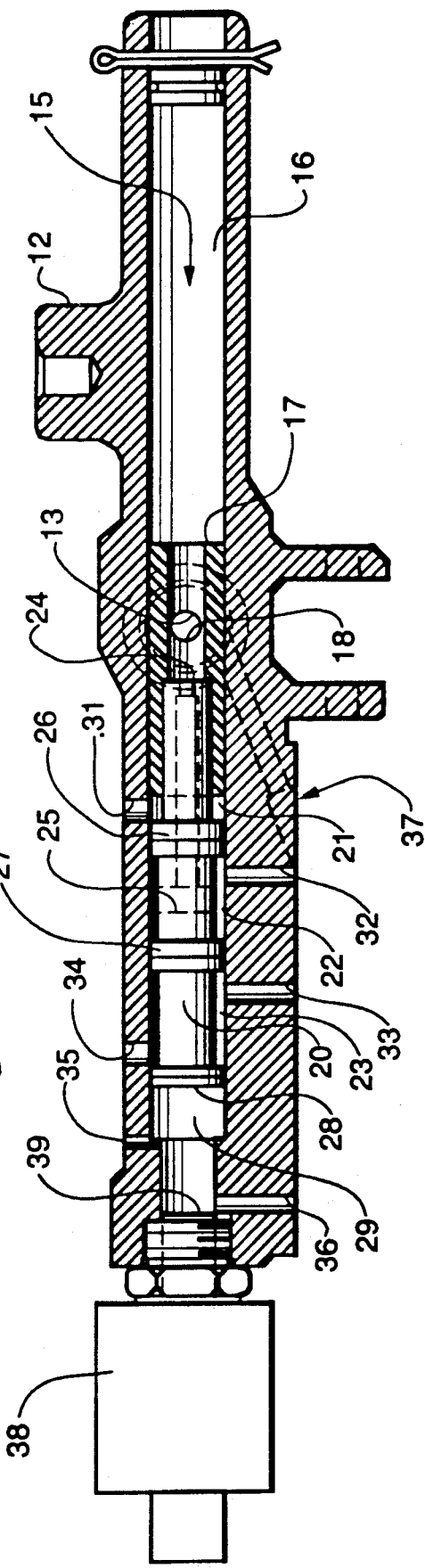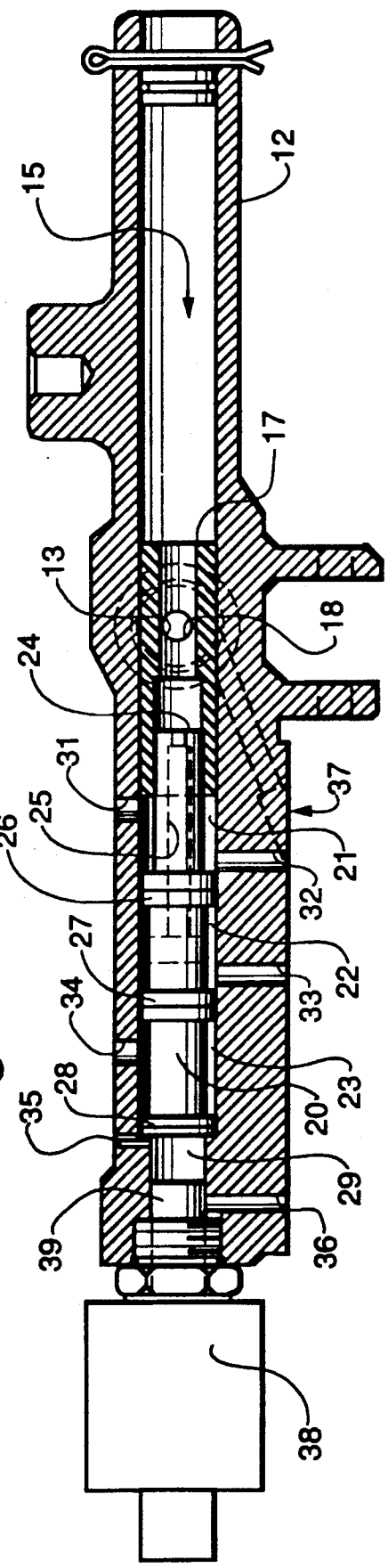

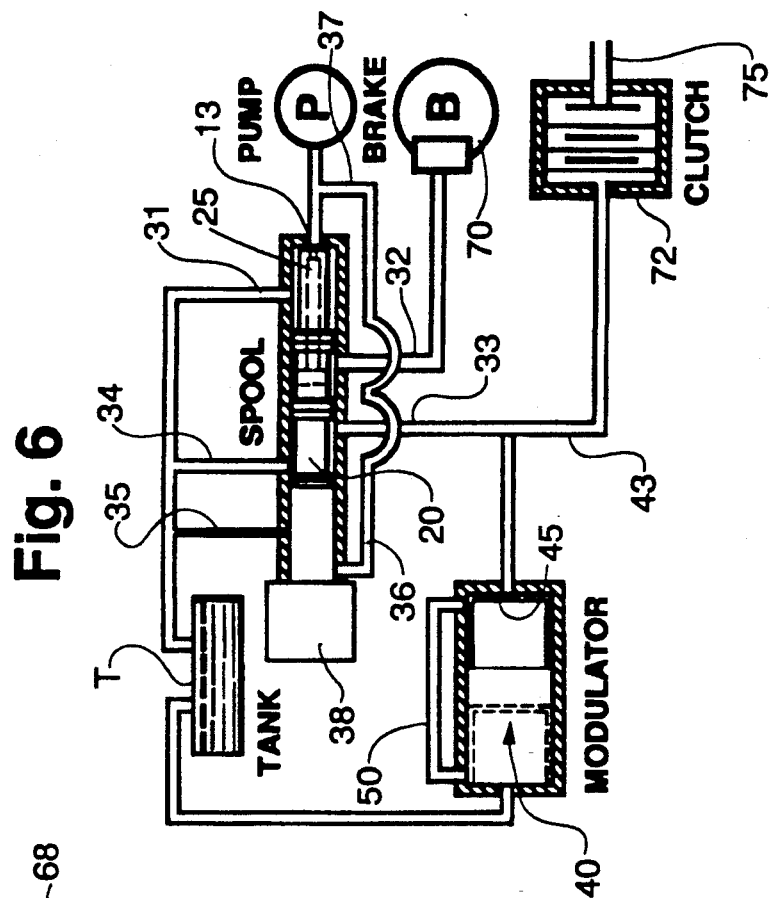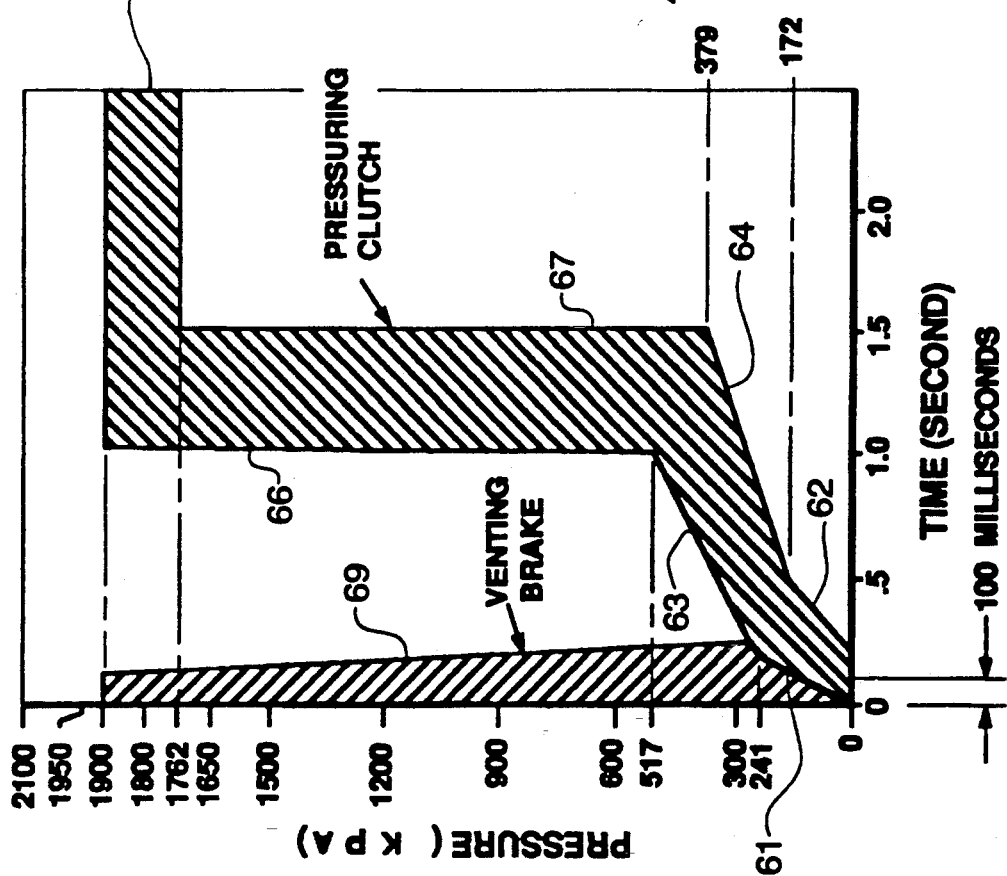

HYDRAULIC MODULATION VALVE

BACKGROUND OF THE INVENTION

The present invention relates generally to tractor hydraulic systems and, more particularly, to a modulation control system for the hydraulic clutch controlling operation of the tractor power-takeoff shaft.

Tractors are typically provided with a power-takeoff shaft operably rotated by the engine carried by the tractor to provide a source of rotational power to an implement or device connected to the tractor. In some instances, the implement connected to the tractor power-takeoff shaft contains considerable mass resulting in a high inertia load to overcome before effecting operation thereof. The on/off control of the tractor PTO is often accomplished through a hydraulic clutch which when engaged permits the transfer of rotational power from the engine to the power-takeoff shaft to operably drive the implement attached thereto.

An instantaneous loading or engagement of the hydraulic clutch in instances where the implement attached to the power-takeoff shaft has a high inertia load can result in structural damage to various components, such as shear bolts typically provided in the implement drive line to protect both the implement and the tractor power-takeoff shaft from shock loading.

Accordingly, it would be desirable to gradually increase the hydraulic pressure applied to the hydraulic clutch for engagement of the power-takeoff shaft in a smooth manner. Prior art devices to accomplish this objective have included mechanical devices, including springs and linkages, to restrict the movement of the valve spool or other structure inhibiting the full engagement of the power-takeoff shaft. Another approach is to utilize electronics, such as through pulse width modulation to modulate the increase in hydraulic pressure to the hydraulic clutch and, therefore, enable a gradual overtaking of the inertia load associated with the attached implement. It would be desirable, however, to provide a simpler, less costly approach to effect a modulation of the hydraulic pressure applied to the PTO clutch.

SUMMARY OF THE INVENTION

It is an object of this invention to overcome the aforementioned disadvantages of the prior art providing a modulation chamber in flow communication with the hydraulic line supplying fluid to the PTO clutch.

It is an advantage of this invention that a modulation chamber can be integrally built into the hydraulic valve housing the shiftable spool controlling the flow of hydraulic fluid to the hydraulic clutch.

It is a feature of this invention that the modulation chamber is provided with a laterally movable, biased piston operable to work against a spring force to gradually increase hydraulic pressure to the hydraulic clutch.

It is another object of this invention to provide an apparatus for modulating hydraulic pressure which can provide a greater rate increase of initial hydraulic pressure than a subsequent rate of increase of hydraulic pressure.

It is another feature of this invention that the modulation chamber is provided with a bypass chamber operable to bleed off hydraulic fluid from the inlet end of the modulation chamber to slow the rate of hydraulic pressure increase within the modulation chamber.

It is another advantage of this invention that the inlet orifice of the bypass chamber is closed by the movable piston whenever the piston is in an initial position adjacent the inlet end of the modulation chamber.

It is still another advantage of this invention that the inlet orifice to the bypass line is uncovered when the piston moves away from the inlet end of the modulation chamber.

It is still another feature of this invention that the outlet orifice for the bypass line drains hydraulic fluid into the outlet end of the modulation chamber behind the movable piston for drainage from the modulation chamber.

It is yet another advantage of this invention that the piston closes off the outlet orifice of the bypass line when moved into the operating position adjacent the outlet end of the modulation chamber.

It is yet another feature of this invention that the positioning of the piston at the operating position, corresponding to the working pressure for the hydraulic PTO clutch, prevents further leakage of hydraulic fluid from the modulation chamber to maintain the working pressure within the modulation chamber.

It is yet another object of this invention to provide a hydraulic clutch modulation control system for a tractor power-takeoff shaft which is durable in construction, inexpensive of manufacture, carefree of maintenance, facile in assemblage, and simple and effective in use.

These and other objects, features and advantages are accomplished according to the instant invention by providing a hydraulic modulation valve for use in conjunction with a tractor power-takeoff shaft to prevent an instantaneous loading of the hydraulic clutch controlling the operation of the power-takeoff shaft wherein the supply line leading from the valve spool to the hydraulic clutch is in flow communication with a modulation chamber. A yieldable spring-loaded piston is moved within the modulation chamber from an initial position to an operating position to allow the hydraulic pressure to increase from zero pressure to a working pressure for the hydraulic clutch. A bypass line bleeds hydraulic fluid from the inlet end of the modulation chamber to slow the rate at which hydraulic pressure is increased within the modulation chamber. The movable piston closes off the inlet opening to the bypass line when in the initial position adjacent the inlet end of the modulation chamber to permit an initial rapid increase of hydraulic pressure, while the piston closes off the outlet opening of the bypass line when reaching the operating position to permit the working pressure within the modulation chamber to remain constant.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is an enlarged detailed view of the shiftable spool in the disengaged or off position;

FIG. 4 is an enlarged detailed view of the shiftable spool similar to that of FIG. 3, except that the spool has been moved into an engaged or on position;

FIG. 5 is a graphic depiction of the increase of hydraulic pressure over time applied to the hydraulic clutch and a venting of the pressure from the braking mechanism under the principles of the instant invention; and FIG. 6 is a hydraulic schematic diagram of the modulation control system for the tractor power-takeoff shaft.

DETAILED DESCRIPTION OF THE PREFERRED EMBODIMENT

Figure 1:
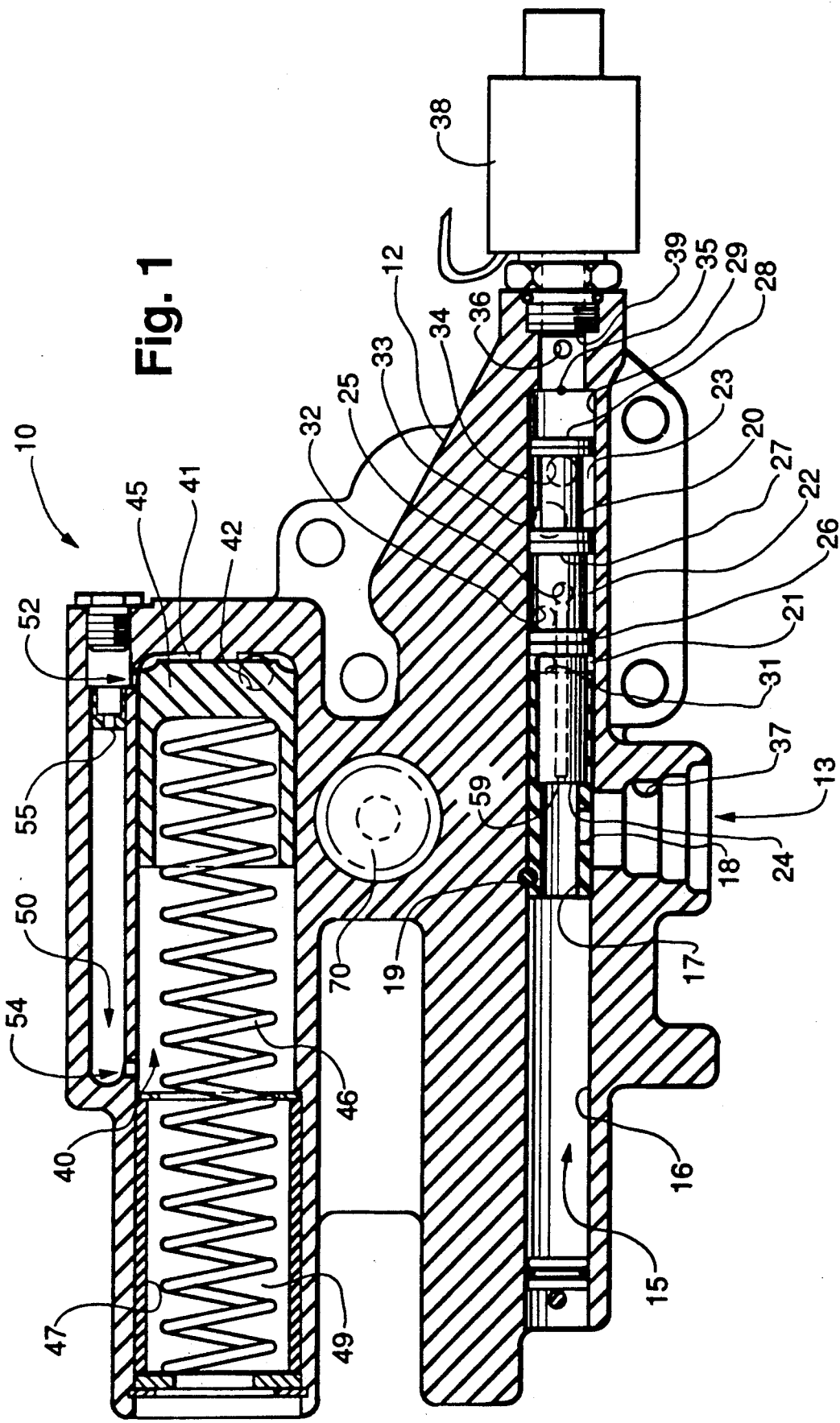
FIG. 1 is a cross-sectional view taken through a hydraulic modulation valve containing the principles of the instant invention, the shiftable spool being shown in a position corresponding to an off condition for the tractor power-takeoff shaft, the movable piston, being positioned in its initial position adjacent the inlet end of the modulation chamber.

Referring now to FIG. 1, a cross-sectional view of a hydraulic valve incorporating the principles of the instant invention can best be seen. The valve 10 includes a valve body 12 housing a linearly movable spool 20 within a spool chamber 15. The spool chamber 15 includes a regulator portion 16 into which a conventional regulating apparatus (not shown) can be housed if required. The valve body 12 is provided with an inlet opening 13 for the introduction of hydraulic fluid into the spool chamber 15. The spool chamber 15 is provided with a hollow stepped sleeve 17 having an inlet opening 18 therein in register with the inlet opening 13 of the valve body 12 to permit the introduction of hydraulic fluid into the hollow sleeve 17. The sleeve 17 is fixed in relation to the spool chamber 15 by a pin 19.

Figure 2:
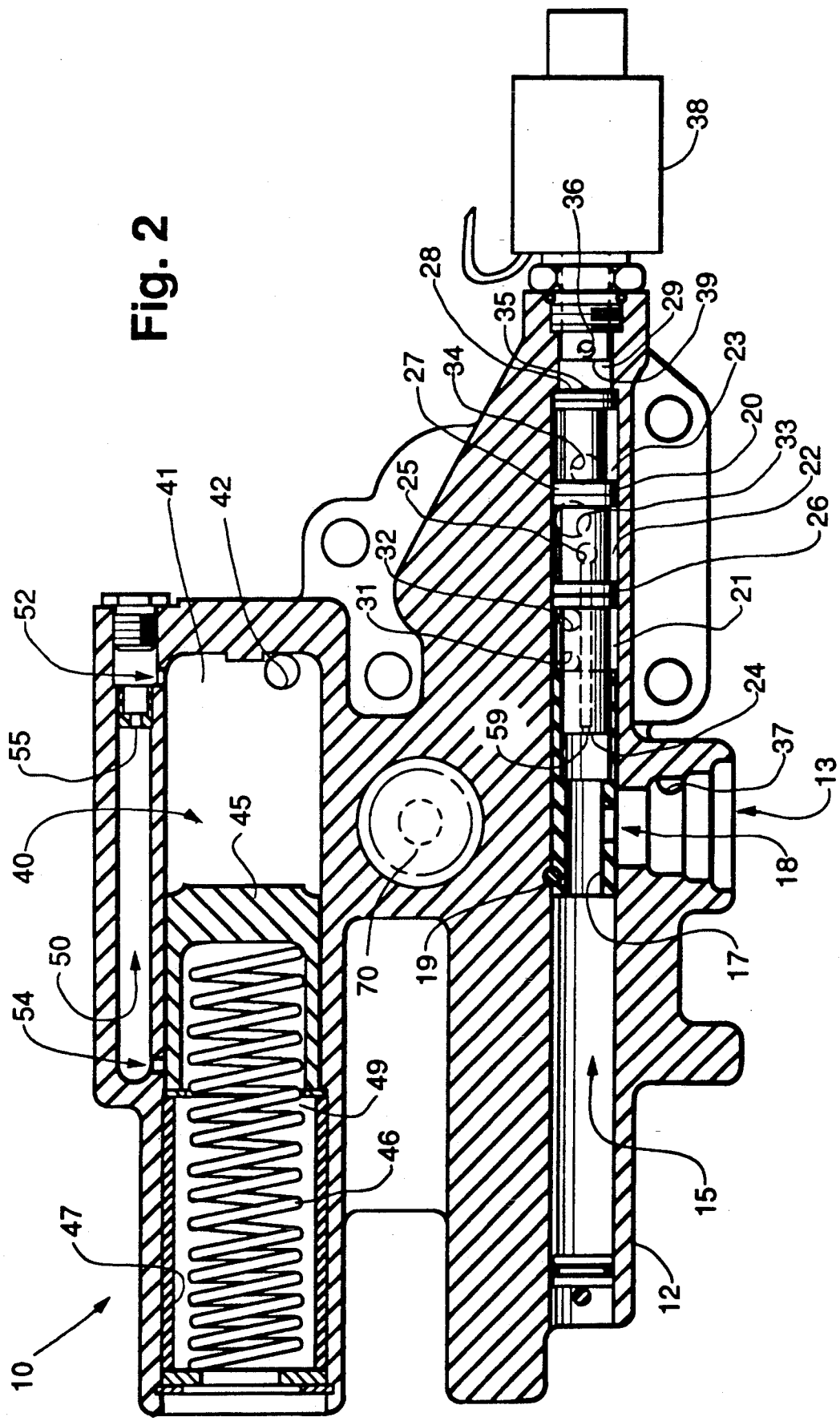
FIG. 2 is a cross-sectional view of the hydraulic modulation valve similar to that of FIG. 1, except the shiftable spool has been moved to a position corresponding to engagement of the tractor power-takeoff, the shiftable piston being retracted to its operating within the modulation chamber.

Referring primarily to FIGS. 1 and 3, but also to FIGS. 2 and 4, the spool 20 is divided into three cavities 21, 22, 23 separated by two lands 26, 27 registering with the spool chamber 15 to retain hydraulic fluid within the respective cavities 21, 22, 23. The spool 20 is formed with an internal passageway 25 extending from the inlet end 24 of the spool 20 and exiting in the second cavity 22 between the first and second lands 26, 27. The remote end of the spool 20 is formed as a third land 28 in register with the spool chamber 15 to define the third cavity 23 between the second and third lands 27, 28 and to provide positional control of the spool 20 as will be described in greater detail below.

The valve body 12 is provided with a plurality of openings for flow communication from the spool chamber 15 for the direction of hydraulic fluid as will be described in greater detail below. As best seen in FIGS. 1-4 and 6, these openings include a first tank port 31 which, as can be seen with reference to the hydraulic schematic diagram of FIG. 6, is in flow communication with the tank T to return hydraulic fluid thereto from the first spool cavity 21; a brake port 32 which directs hydraulic fluid to a braking apparatus 70; a clutch port 33 which is in flow communication with a clutch mechanism 72 for the direction of hydraulic fluid thereto; a second tank port 34 directing a return of hydraulic fluid to the tank T; a third tank port 35 also permitting the return of hydraulic fluid to the tank T; and a remote chamber inlet port 36 which is in flow communication with a remote chamber feed port 37 directing hydraulic fluid from the inlet opening 13 to a remote chamber 29 forming part of the spool chamber 15 located behind the third land 28, such that the third land 28 is positioned between the third spool cavity 23 and the remote chamber 29.

The positioning of the spool 20 is controlled by an electric solenoid 38 having an extensible plunger 39 operable when the solenoid 38 is energized to extend into the remote chamber 29 and close off the remote chamber inlet port 36. Although the plunger 39 is schematically shown in the drawings, typical construction of such devices normally provide for the flow of hydraulic fluid through a valve member (not shown) which is cooperable with the solenoid actuated plunger 39, which is spring-loaded against the extensible movement caused by the energized solenoid. Referring to FIGS. 3 and 4 and to the hydraulic schematic diagram of FIG. 6, the operation of the spool 20 can best be seen. When the solenoid plunger 39 is retracted, as shown in FIG. 3, hydraulic fluid under pressure is directed from the remote chamber feed port 37 to the remote chamber inlet port 36 by an appropriate conduit, such as a groove in a cover plate (not shown) as is well known in the art, to pressurize the remote chamber 29.

Since the surface area of the third land 28 is larger than the surface area of the inlet end of the spool 24, which is exposed to the same system pressure as the hydraulic fluid entering the remote chamber feed port 37, hydraulic pressure forces the spool 20 against the stepped portion of the sleeve 17 to an off position. A continuous flow of hydraulic fluid under pressure between the inlet opening 13 and the remote chamber 29 is provided by the third tank port 35 which circulates hydraulic fluid back to the tank T. An energizing of the solenoid 38 to extend the plunger 39 to a position to seal off the remote chamber inlet port 36 allows a reduction of hydraulic pressure in the remote chamber 29 due to the presence of the third tank port 35. As a result, the greater hydraulic pressure against the inlet end 24 of the spool 20 forces the spool 20 away from the inlet opening 13 to an on position.

Referring now to FIGS. 1 and 2, it can be seen that the valve body 12 incorporates a modulation chamber 40 having an inlet opening 42 in flow communication with a first supply line 43 directing hydraulic fluid from the clutch port 33 to the clutch mechanism 72, as depicted in the hydraulic schematic diagram of FIG. 6. The modulation chamber 40 houses a linearly movable piston 45 registered therewith to prevent the flow of hydraulic fluid past the piston 45. The piston 45 is biased toward the inlet end 41 of the modulation chamber 40 by a compression spring 46. The outlet end 49 of the modulation chamber 40 is open to return hydraulic fluid to the tank T for purposes to be described in greater detail below. The introduction of hydraulic fluid into the inlet end 41 of the modulation chamber 40, thereby pressurizing the inlet end 41, causes the piston 45 to move toward the outlet end 49 until being stopped by a sleeve 47, as depicted in FIG. 2.

The valve body 12 also incorporates a bypass chamber 50 forming a hydraulic flow line bypassing the piston 45 and having an inlet opening 52 in flow communication with the inlet end 41 of the modulation chamber 40 and an outlet opening 54 in flow communication with the outlet end 49 of the modulation chamber. The bypass chamber 50 includes a metering device 55 restricting the flow of hydraulic fluid from the inlet opening 52 to the outlet opening 54 to a rate of flow that is less than the flow of hydraulic fluid introduced into the inlet end 41 through the opening 42. The piston 45 seals off the inlet opening 52 to the bypass chamber 50 when positioned in its initial position as depicted in FIG. 1. The retraction of the piston 45 toward the outlet end 49 of the modulation chamber 40 against the sleeve 47, corresponding to an operating position of the piston 45, initially opens up the inlet opening 52 and eventually seals off the outlet opening 54, as is depicted in FIG. 2.

Referring primarily to FIG. 6, it can be seen that the hydraulic modulation valve constructed as described above can be utilized to supply hydraulic fluid under gradually increasing pressure to a clutch mechanism 72 used to control the engagement of a tractor power-takeoff shaft 75 which is typically connected to an implement (not shown) towed by the tractor (not shown) and having a relatively high inertia load that must be overcome before effecting full operation thereof. The hydraulic modulation valve 10 enables the power-takeoff shaft to be gradually engaged so as to prevent a shock loading of rotational power to the implement, causing structural damage to the drive line components or the implement itself. The braking apparatus 70 is conventionally cooperable with the clutch mechanism 72 to halt the rotation of the power-takeoff shaft 75 after disengagement of the clutch mechanism 72. The braking apparatus 70 is designed to hold the power-takeoff shaft 75 fixed with cold hydraulic fluid in the system.

Referring now to FIGS. 3 and 4, it can be seen that the positioning of the spool 20 in the off position, seen in FIG. 3, permits the brake port 32 to be aligned with the second cavity 22 into which is introduced hydraulic fluid under pressure from the pump P through the internal passageway 25. Accordingly, the braking apparatus 70 is activated to halt the rotation of the power-takeoff shaft 75. Simultaneously, the clutch port 33 is aligned with the third cavity 23, as is the second tank port 34, allowing hydraulic fluid to escape from the clutch mechanism 72 back to the tank T.

Energizing the solenoid 38 to extend the plunger 39 across the remote chamber inlet port 36 to prevent the flow of hydraulic fluid therethrough results in a movement of the spool 20 into the on position, as shown in FIG. 4 and described above. As a result, the brake port 32 is now aligned with the first cavity 21, as is the first tank port 31 to permit a draining of hydraulic fluid from the braking apparatus 70 to the tank T and, thereby, disengage the braking apparatus 70. Simultaneously, the clutch port 33 is now aligned with the second cavity 22 for the introduction of hydraulic fluid under pressure from the pump P through the internal passageway 25. Since the second land 27 is positioned between the clutch port 33 and the second tank port 34 the second cavity 22 can be pressurized by the pump P. A deenergizing of the solenoid 38 to retract the plunger 39 allows a pressurization of the remote chamber 29, as described above, to return the spool 20 to the off position shown in FIG. 3, whereby the braking apparatus 70 becomes pressurized and the clutch mechanism 72 is drained to tank T.

Referring now to FIGS. 1, 2 and 6, it can be seen that the movement of the spool 20 into the on position to pressurize the clutch mechanism 72 results in the introduction of hydraulic fluid through the first supply line 43 into the inlet end 41 of the modulation chamber 40. The increasing supply of hydraulic fluid through the inlet opening 42 into the modulation chamber 40 results in a retraction of the piston 45 against the spring 46 toward the outlet end 49 of the chamber 40. After the piston 45 has moved away from its initial position as shown in FIG. 1, the inlet opening 52 of the bypass chamber 50 is uncovered and a flow of hydraulic fluid through the metering device 55 into the bypass chamber 50 and ultimately into the outlet end 49 of the chamber 40 is then permitted.

The continuing supply of hydraulic fluid into the modulation chamber 40 continues the retraction of the piston 45 against the spring 46 until the piston 45 reaches the sleeve 47 and its operating position, as shown in FIG. 2. The movement of the piston 45 toward this operating position closes off the outlet opening 54 of the bypass chamber 50, resulting in a termination of flow of hydraulic fluid through the bypass chamber 50. Since the outlet opening 54 is closed off prior to the piston 45 reaching the operating position against the sleeve 47, the increase of hydraulic pressure within the modulation chamber 40 increases more rapidly after the outlet opening 54 is closed until the piston 45 seats against the sleeve 47. Because of the increased resistance exerted by the spring 46, the hydraulic pressure in the modulation chamber 40 and the first supply line 43 delivering hydraulic fluid to the clutch mechanism 72 gradually increases to a working pressure required for operation of the clutch mechanism 72, which corresponds to the operating position of the piston 45. Since hydraulic fluid is prevented from bypassing the piston 45, the hydraulic pressure within the modulation chamber 40 remains at the working pressure for the clutch mechanism 72.

Because the metering device 55 restricts the flow of hydraulic fluid out of the inlet end 41 of the modulation chamber 40 to a rate of flow that is slower than introduction of hydraulic fluid through the inlet opening 42, which is also restricted by the metering device 59 to control the flow of hydraulic fluid through the first supply line 43 to the modulation chamber 40, hydraulic pressure will continue to increase within the modulation chamber 40 until the piston 45 reaches its operating position. However, the initial rate of hydraulic pressure increase within the modulation chamber 40 is greater at the onset of movement of the piston 45 away from its initial position because the piston 45 initially seals off the inlet opening 52, thereby preventing fluid from escaping the modulation chamber 40 until a predetermined pressure level has been reached, at which time the piston 45 uncovers the inlet opening 52.

FIG. 5 is a graphic depiction of the increase of pressure in the modulation chamber 40 accomplished through this described arrangement. The initial buildup of hydraulic pressure within the modulation chamber 40 is defined within the range bounded by lines 61 and 62 covering the first 100 to 500 milliseconds after the spool 20 has been moved into the on position. The subsequent increase of hydraulic pressure, corresponding to the uncovering of the inlet opening 52 by the piston 45, is at a slower rate of increase as defined by the range of pressure between lines 63 and 64. After about 1.0 to 1.5 seconds have elapsed, the piston 45 will have closed off the outlet opening 54 of the bypass line 50 and the subsequent buildup of hydraulic pressure is quite rapid, as defined by the range of pressure banded by lines 66 and 67, until the piston 45 reachs its operating position against the sleeve 47 and the hydraulic pressure within the modulation chamber 40 is at the working pressure for the clutch mechanism 72 as defined by the pressure range band 68. FIG. 5 also depicts the venting of hydraulic pressure from the braking apparatus 70, which is indicated by the pressure range band 69.

Consequently, it can be seen that the clutch mechanism 72 can be pressurized relatively quickly to the pressure necessary to effect an engagement of the clutch plates by the time the piston 45 uncovers the inlet opening 52. A subsequent buildup of hydraulic pressure is more gradual and increases the torque carrying capability of the clutch mechanism 72 from essentially nothing to its full torque carrying capability by the time the piston 45 reaches its operating position, which covers a span of time from between 0.5 seconds to about 1.5 seconds. As a result, the tractor power-takeoff shaft 75 is not subjected to an instantaneous loading of full torque carrying capability of the clutch mechanism 72, thereby allowing the inertia load of the implement attached to the tractor to be gradually overcome as the hydraulic pressure within the modulation chamber 40 gradually increases against the spring 46.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A modulation valve for hydraulic system comprising:
   a valve body housing a spool movable between first and second positions, the positioning of said spool in said first position directing hydraulic fluid toward a first hydraulic apparatus through a first supply line;
   a modulation chamber in flow communication with said first supply line, said modulation chamber having an inlet end and an outlet end; and
   means for gradually increasing hydraulic pressure in said modulation chamber to effect a gradual increase in hydraulic pressure in said first supply line form a first system pressure to an operating pressure for said first hydraulic apparatus, said means for gradually increasing pressure including a linearly movable piston registering with said modulation chamber, said piston moving from an initial position at said inlet end of said modulation chamber toward said outlet end in response to an increase in hydraulic pressure in said modulation chamber, said piston being biased toward said inlet end by a spring.

2. The modulation valve of claim 1 wherein said modulation chamber is provided with a bypass line to bleed hydraulic fluid away from said modulation chamber, said bypass line having a inlet opening smaller than said first supply line so that hydraulic fluid will bleed away from said modulation chamber slower than said first supply line supplies hydraulic fluid to said modulation chamber, thereby decreasing the rate at which hydraulic pressure is increased in said modulation chamber.

3. The modulation valve of claim 2 wherein said piston closes off said inlet opening of said bypass line when in said initial position, said inlet opening becoming uncovered after said piston has moved away from said initial position, whereby the initial increase of hydraulic pressure within said modulation chamber is at a faster rate than subsequent increases in hydraulic pressure.

4. The modulation valve of claim 3 wherein said piston is movable to an operating position corresponding to an increase of hydraulic pressure within said modulation chamber and within said first supply line to a working pressure for said first hydraulic apparatus, said bypass line being inoperable to bleed hydraulic fluid away from said modulation chamber when said piston reaches said operating position.

5. The modulation valve of claim 4 wherein said bypass line has an outlet opening in flow communication with the outlet end of said modulation chamber, the outlet end of said modulation chamber being open for the flow of hydraulic therefrom, said piston closing off said outlet opening of said bypass line when in said operating position to prevent further flow of hydraulic fluid through said bypass line until said piston returns toward said inlet end.

6. The modulation valve of claim 5 wherein said spool drains hydraulic fluid away from said first hydraulic apparatus when in said second position, thereby reducing hydraulic pressure in said first supply line and said modulation chamber, allowing said spring to move said piston to said initial position.

7. The modulation valve of claim 6 wherein the placement of said spool in said second position directs hydraulic fluid under pressure through a second supply line to a second hydraulic apparatus cooperable with said first hydraulic apparatus to stop operation thereof.

8. The modulation valve of claim 7 wherein said first hydraulic apparatus is a hydraulic clutch controlling upon engagement thereof the operation of a tractor power takeoff shaft, said second hydraulic apparatus being a brake engageable with said hydraulic clutch to stop the operation of said tractor power takeoff shaft when said hydraulic clutch is disengaged.

9. A hydraulic valve for modulating the engagement of the operation of a tractor power takeoff shaft comprising:
   a valve body housing a spool movable between first and second positions, the positioning of said spool in said first position directing hydraulic fluid toward a hydraulic clutch through a first supply line, said hydraulic clutch controlling the operation of said tractor power takeoff shaft;
   a modulation chamber in flow communication with said first supply line, said modulation chamber having an inlet end and a remote outlet end;
   a linearly movable piston housed in said modulation chamber in register therewith, said piston being movable between an initial position adjacent said inlet end and an operating position adjacent said outlet end;
   a spring operably associated with said piston to bias said piston toward said initial position, said piston working against said spring as said piston moves from said initial position toward said operating position to increase hydraulic pressure within said modulation chamber and within said first supply line to a working pressure for said hydraulic clutch when said piston is in said operating position; and
   a bypass line having an inlet opening proximate to the inlet end of said modulation chamber and an outlet opening to direct hydraulic fluid from said bypass line away from said modulation chamber, the size of said inlet opening being smaller than said first supply line so that a greater volume of hydraulic fluid can enter said inlet end of said modulation chamber than can flow through said inlet opening into said bypass line, thereby allowing hydraulic pressure in said modulation chamber to gradually increase as said piston moves toward said operating position.

10. The hydraulic valve of claim 9 wherein said bypass line is inoperable to direct hydraulic fluid away from said modulation chamber when said piston reaches said operating position, thereby permitting the pressure within said modulation chamber and in said first supply line to remain at said working pressure.

11. The hydraulic valve of claim 10 wherein said outlet end of said modulation chamber is open for the flow of hydraulic fluid therefrom, said outlet opening of said bypass line directing hydraulic fluid into said outlet end of modulation chamber, said piston closing off said outlet opening when in said operating position.

12. The hydraulic valve of claim 9 wherein said piston closes off said inlet opening of said bypass line when in said initial position, said inlet opening becoming uncovered after said piston has moved away from said initial position, whereby the initial increase of hydraulic pressure within said modulation chamber is at a faster rate than subsequent increases in hydraulic pressure until said working pressure is reached.

13. The hydraulic valve of claim 9 wherein the placement of said spool in said second position directs hydraulic fluid under pressure through a second supply line to a braking apparatus operably associated with said hydraulic clutch to stop operation of said tractor power takeoff shaft, the placement of said spool in said second position draining hydraulic fluid from said hydraulic clutch.

* * * * *